Feb. 11, 1930.   S. B. WINN   1,746,454
FOUR-WHEEL BRAKE
Filed March 13, 1926    4 Sheets-Sheet 1

Inventor
Sidney B. Winn,
By
Attorneys

Feb. 11, 1930.  S. B. WINN  1,746,454
FOUR-WHEEL BRAKE
Filed March 13, 1926  4 Sheets-Sheet 2

Inventor
Sidney B. Winn,
By
Attorney

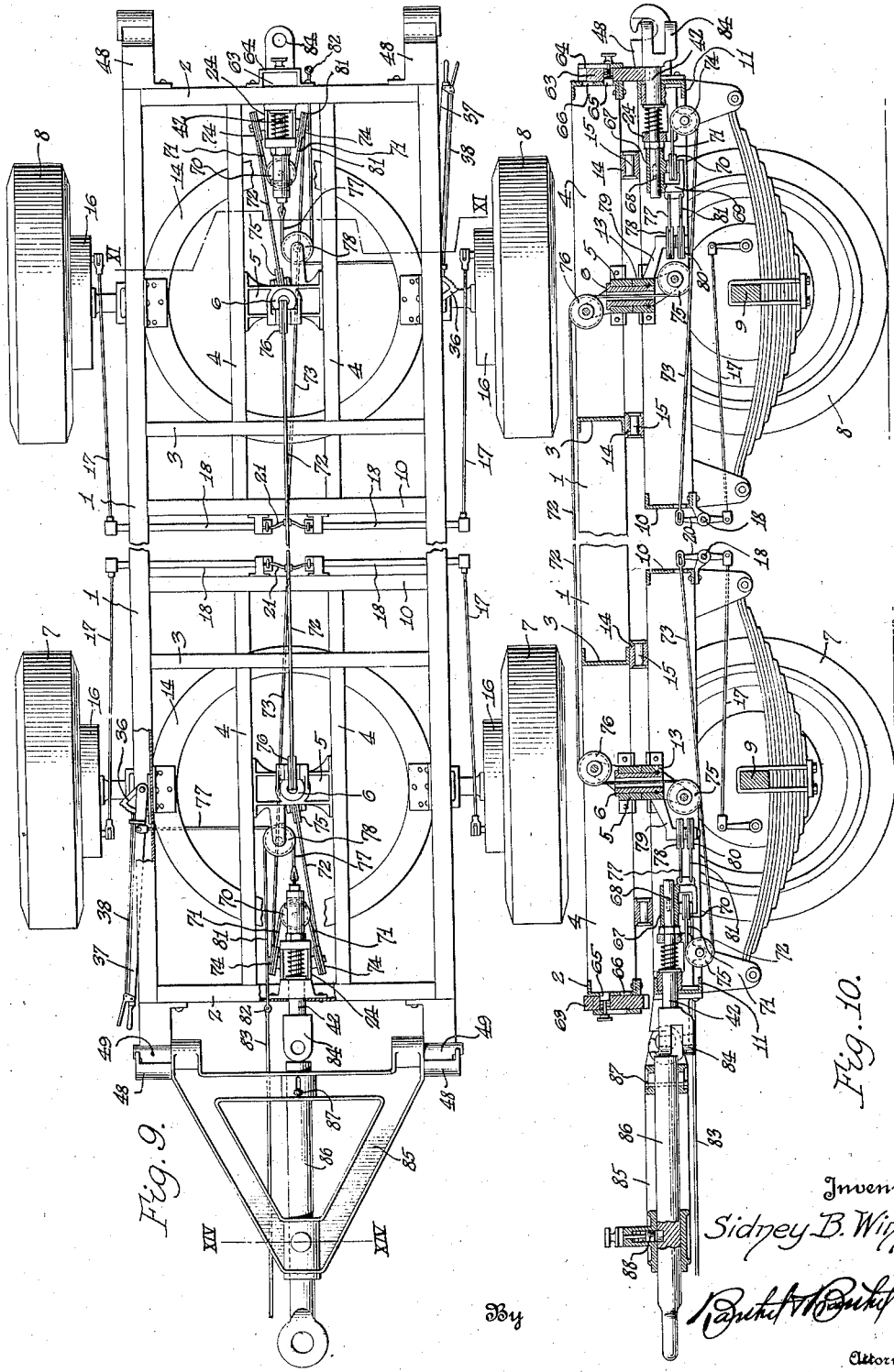

Feb. 11, 1930.　　　　S. B. WINN　　　　1,746,454
FOUR-WHEEL BRAKE
Filed March 13, 1926　　　4 Sheets-Sheet 4
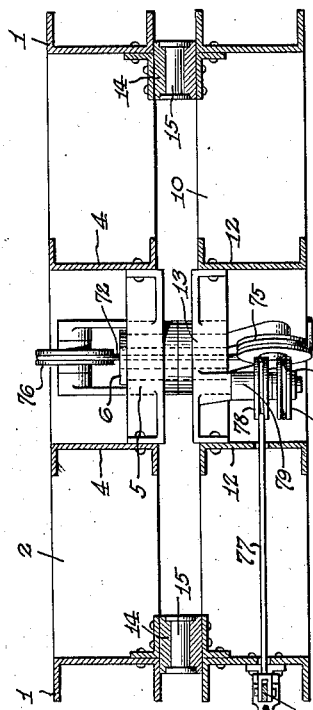
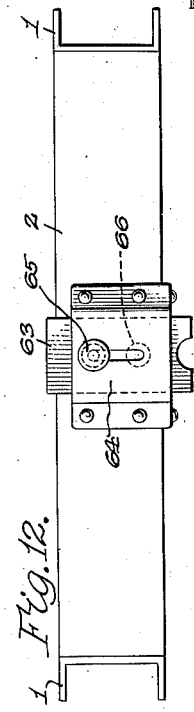
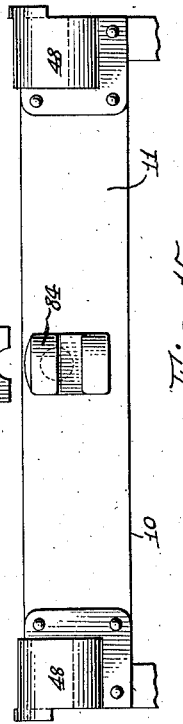
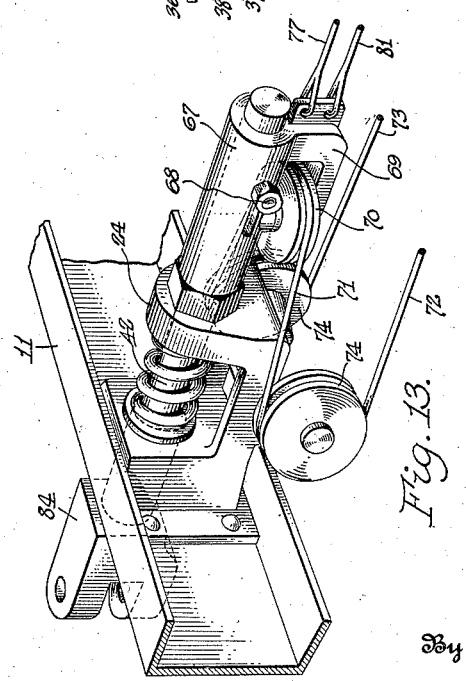
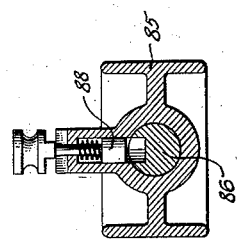
Inventor
Sidney B. Winn,
Attorney Patented Feb. 11, 1930

1,746,454

UNITED STATES PATENT OFFICE

SIDNEY B. WINN, OF LAPEER, MICHIGAN

FOUR-WHEEL BRAKE

Application filed March 13, 1926. Serial No. 94,404.

This invention relates to four-wheel trailer brake mechanism and has special reference to a tractor trailer combination wherein a tractor is adapted to tow and otherwise move the trailer. In the operation of such a train of vehicles the towing vehicle is ordinarily limited to coupling at one end of the towed vehicle, instead of either end, then again, on account of grades, ruts and other road conditions the towed vehicle often attempts to crowd or overrun the towing vehicle. These are a few of the operating conditions which my invention aims to improve, particularly in connection with a tractor trailer combination, which may be characterized in the following particulars.

First, there is a double ended trailer, that is, a trailer chassis supported by individual swiveled end trucks to either of which a tractor or towing vehicle may be coupled with provision for fixing the swiveled end farthest from the tractor or towing vehicle so that its direction of travel will be at all times the same as the trailer chassis or body.

Second, a novel tongue is employed in connection with the above type of trailer for connecting either truck of the trailer to a tractor or towing vehicle.

Third, the trailer as outlined above is equipped with an interconnecting truck brake mechanism and a hand brake control at each end of the trailer. The brake operating mechanism extends from one truck, through the swivel of said truck, to and through the swivel of the other truck, with connections to the brakes of each truck, the brake operating means being operable at the active swiveled truck, by the trailer overrunning the tractor, or by the hand control at either end of the trailer. This arrangement of the brake operating mechanism necessitates a draw bar in connection with the tongue, said draw bar including a draft appliance and means whereby it may be fixed relative to the tongue to prevent the application of the trailer brakes when the tractor backs the trailer. In one embodiment of my invention the trailer brake equipment may be controlled by the tractor attached to either end of the trailer.

My invention has been illustrated and will be hereinafter described in two forms, one wherein comparatively rigid connecting members or rods are used for articulating the truck brakes, and in the other arrangement flexible or continuous connecting members are utilized for controlling the truck brakes. In both forms the brake connecting means is built into the truck frames and the trailer chassis in such a manner as not to interfere with a swivel action of either trailer truck or a body mounted on the trailer chassis.

Reference will now be had to the drawings, wherein

Fig. 9 is a plan of another form of trailer and towing tongue;

Fig. 10 is a vertical longitudinal sectional view of the same;

Fig. 11 is a cross sectional view taken on the line XI—XI of Fig. 9;

Fig. 12 is an end view of the trailer chassis shown in Fig. 10;

Fig. 13 is a perspective view of a coupler or truck pin;

Fig. 14 is a cross sectional view taken on the line XIV—XIV of Fig. 9, and

Fig. 15 is an end view of a truck sill forming part of the trailer shown in Figs. 9 and 10.

Figures 1, 2:
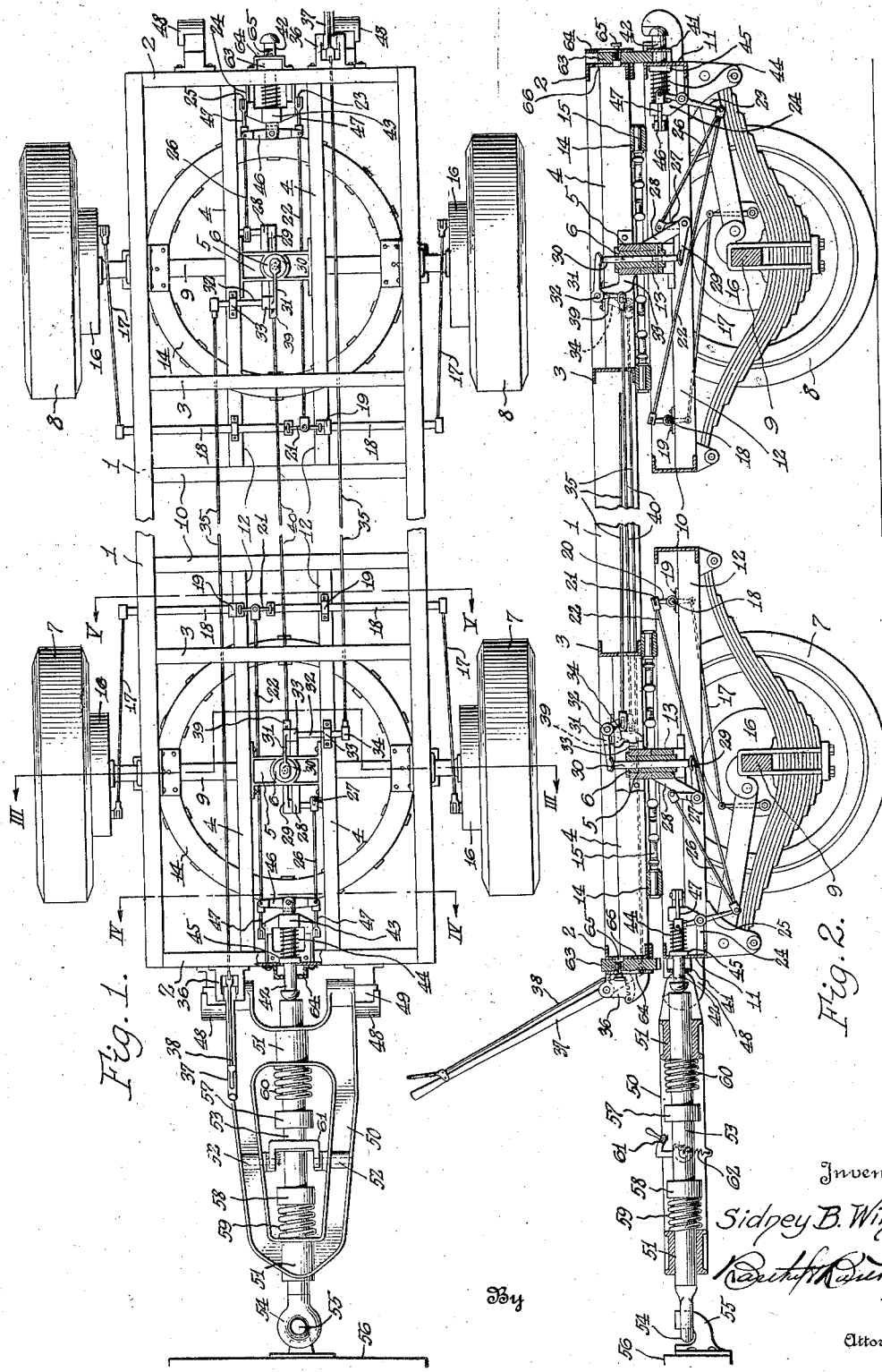
Figure 1 is a plan of a trailer and towing tongue in accordance with this invention showing the central portion of the trailer broken away to indicate that it may be of any desired length.
Fig. 2 is a vertical longitudinal sectional view of the same.
Figure 3:
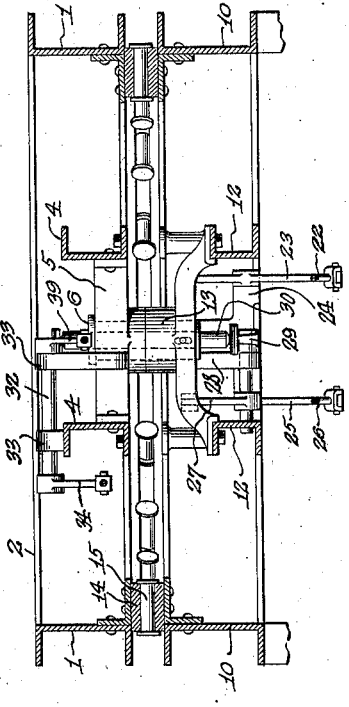
Fig. 3 is an enlarged cross sectional view taken on the line III—III of Fig. 1.
Figure 4:
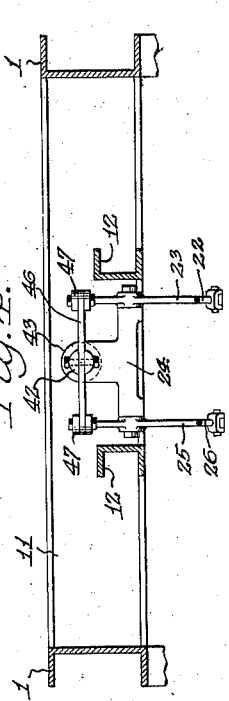
Fig. 4 is a similar view taken on the line IV—IV of Fig. 1.

Reference will first be had to Figs. 1 to 8 inclusive showing a trailer chassis 1 having end members or sills 2 and suitable longitudinal and transverse braces which may include transverse members 3 and longitudinal members 4, the latter being disposed in parallelism to support, at each end of the trailer chassis, a bolster 5 provided with a tubular king pin 6.

Under the trailer chassis 1 are swiveled trucks which are generally designated 7 and 8. These trucks are identical in construction, therefore I deem it only necessary to describe one of said trucks, and then consider the cooperation of the trucks particularly in connection with the brake operating mechanism. Each truck includes a suitable axle 9 having its ends provided with wheels and suitable spring suspension for a truck frame 10 with said frame including an outer end sill 11 and interior longitudinal members 12 supporting a bolster 13 which receives the tubular king pin 6, so that the truck is swiveled relative to the trailer chassis. The truck frame and trailer chassis are provided with complemental fifth wheel members 14 that may have anti-frictional rollers 15 therebetween, thus affording a substantial fifth wheel action for each truck at each end of the trailer chassis. Obviously such a trailer chassis with two swiveled trucks could not be conveniently or even safely towed unless some provision were made for fixing either truck relative to the trailer chassis so that it could constantly travel in the same direction the trailer chassis is towed. That truck which is fixed, in a manner to be hereinafter described, relative to the trailer chassis will be termed, for the sake of clearness, an inactive truck, and that truck which is swiveled and capable of guiding the trailer in a desired direction will be known as the active truck.

Figure 5:
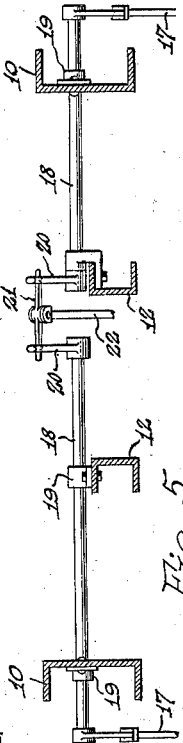
Fig. 5 is a similar view taken on the line V—V of Fig. 1.
Figure 6:
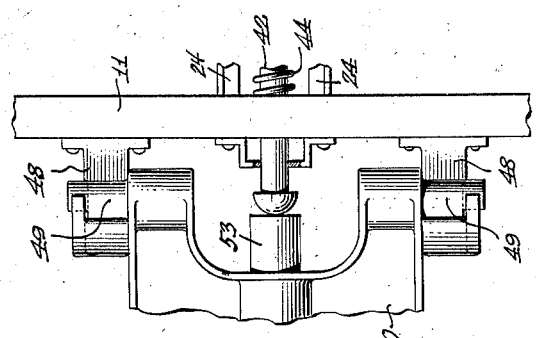
Fig. 6 is an enlarged plan of the tongue and trailer connection.
Figures 7, 8:
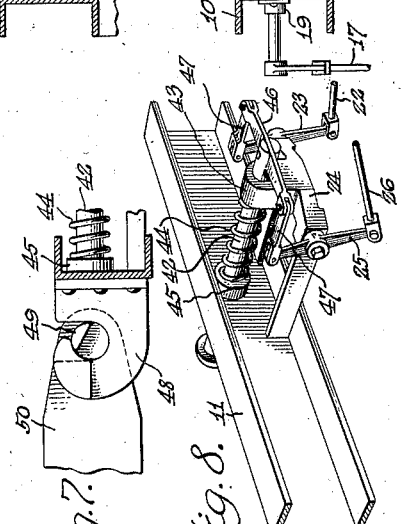
Fig. 7 is a side elevation of the same.
Fig. 8 is a perspective view of a tongue actuated pin such as carried by each truck of the trailer.

Each truck has a conventional form of brakes 16 provided with rods 17 extending to rock crank shafts 18 journaled in bearings 19 carried by the truck. The rock shafts 18, as best shown in Fig. 5, have cranks 20 thereof engaged by an equalizing member 21 connected to a rod 22 extending towards the outer end of the truck and connected to a double crank 23 pivotally mounted on a yoke shaped bracket 24 supported from the end sill 11 of the truck. See Fig. 8. This bracket has another double crank 25 connected by a rod 26 to a bell crank 27 pivotally supported from a bracket 28, carried by the bolster 13 of the truck. The bell crank 28 extends under the tubular king pin 6 and has a shoe 29 supporting a brake pin 30 in the tubular king pin 6. Engaging the upper end of the brake pin 30 is the shoe of a crank 31 mounted on a rock shaft 32 journaled in bearings 33 carried by the bolster 5 and the members 4 of the trailer. The rock shaft 32 has another crank 34 connected to a rod 35 that extends longitudinally of the trailer chassis to what I will now consider as the rear end of the chassis, which is provided with a bearing 36 for a hand brake lever 37 having a conventional form of securing device 38 by which the lever may be secured in an adjusted position. The elements 36 to 38 inclusive constitute a hand control for the brakes of the truck 7. It must be remembered that the brake operating mechanism just described in connection with the truck 7 and the rear end of the trailer chassis 1 is duplicated for the truck 8 and the front end of the trailer chassis. To prevent either of the hand lever connections from interfering with the operation of the brake mechanism, the cranks 34 have long slot connections with the rods 35. This simply means that the hand levers 37 require a greater throw than ordinarily to effect hand control of the truck brakes.

In order that there may be an interconnecting brake mechanism whereby the brakes of the trucks 7 and 8 may be simultaneously applied, when the trailer attempts to overrun the tractor, the rock shafts 32 have cranks 39 connected by a rod 40.

The end sill 11 of each truck has a keeper 41 and slidable in said keeper and the end sill is a tongue pin 42 which is also slidable in a bearing 43 carried by the yoke shaped bracket 24 of the sill 11. Encircling the tongue pin 42, is a coiled expansion spring 44 abutting the bearing 43 and a collar 45 mounted on the tongue pin with the expansive force of the spring 44 holding the collar normally against the sill 11, yet permitting inward movement of the tongue pin 42, as will hereinafter appear. On the inner end of the tongue pin 42 is pivotally mounted a beam 46 having its ends connected by links 47 to the double cranks 23 and 25. As a result of this arrangement the tongue pin 42 may be pushed inwardly to actuate the cranks 23 and 25. The crank 23 by its rod connection 22 will cause the brakes 16 of the truck 7 to be applied, and the crank 25 by its connecting elements 26, 27, 29, 30, 31, 32, 39 and 40, will cause the brakes 16 of the truck 8 to be applied. In providing this latter action, it will be understood that when pin 42 is pushed inward the action will provide upward movement of brake pin 30 of truck 7 and downward movement of brake pin 30 of truck 8, the result being that rod 26 of truck 7 will be drawn by the lower end of crank 25 while the rod 26 of truck 8 will be drawn by the lever 29 to draw the lower end of crank 25 of the latter truck; in other words, the direction of movement of the crank 25, rod 26 and a lever 27 of one truck will be opposite the direction of movement of the same members in the other truck. While this might appear to prevent the concurrent movement of the brakes of the two trucks, such, actually, is not the case. This is due to the fact that in the direction of brake application referred to, the movement of pin 42 produces movement of both cranks 23 and 25 of truck 7, while the connections above referred to apply movement to but one of these cranks (crank 25) of the truck 8. Hence it will be seen that the drawing movement of the lower end of crank 25 of truck 8 moves the upper end of said crank in the opposite direction and draws this end of beam 46 to rock the latter on its pivot; such rocking movement causes the other end of the beam—connected to the upper end of crank 23—to draw such upper end of the latter crank in the direction to apply the brakes in precisely the same way as if the push pin 42 of truck 8 were the active element; hence, crank 23 is moved in the proper direction to apply the brakes regardless of which of the pins 42 is active as the source for brake application. All of these elements are brought into operation when the trailer attempts to crowd or overrun a tractor or towing vehicle, by virtue of a towing tongue that will now be described.

The truck sill 11 is provided with hook shaped bearings 48 for the trunnions 49 of a tongue 50. The bearings 48 and the trunnions 49 are made to afford an interlocking connection so that the tongue 50 cannot become vertically disposed relative to the trailer chassis, and can only be removed when bodily placed in substantially a vertical position. The tongue has a set of longitudinal bearings 51 and a set of transversely alining bearings 52. Slidable in the longitudinally alining bearings 51 is a draw bar 53 having its outer end provided with an eye 54 that may be conveniently connected to a hook member 55 on the rear end of a tractor or towing vehicle 56, the hook and eye being a sample of various types of coupler heads or coupling devices by which the tractor may be connected to the trailer.

The inner or rear end of the draw bar 53 abuts the tongue pin 42 and on the draw bar are collars 57 and 58. Encircling the draw bar between the collar 58 and the outer bearing 51 is a coiled draft spring 59 and encircling the draw bar between the collar 57 and the inner bearing 51 is a cushion spring 60. The draft spring 59 cushions the forward movement of the draw bar 53 relative to the tongue 50 and permits of the tractor 56 easily picking up a loaded trailer. The spring 60 simply cushions the draw bar 53 relative to the tongue when the draw bar is pushed rearwardly by the tractor a predetermined distance.

Journaled in the transversely alining bearings 52 of the tongue are the trunnions of a yoke shaped anti-brake applying latch 61 which can be swung downwardly behind the collar 58 to prevent the trailer brake mechanism from being actuated when the tractor is backing the trailer. A spring 62 associated with the latch 61 is adapted to hold the latch in either an open or closed position and when the tractor is to back the trailer it is necessary for the driver of the tractor or an attendant of the trailer to set the latch 61 in a closed position and thus prevent the trailer brake mechanism from being actuated during any backing operation, although the trailer brake mechanism at one or the other end of the trailer may be controlled by one or the other of the hand levers 37.

As pointed out in the beginning it is necessary to render one of the swiveled trucks inactive against any turning movement while the trailer is being moved by the tractor. According to Figs. 1 and 2 the front truck 7 is free to turn and the rear truck 8 is fixed relative to the trailer chassis. This fixing of either of the trucks is accomplished by vertically reciprocable truck latch 63 at each end of the trailer chassis, the sills or end members 2 of the trailer chassis being provided with slotted guides 64 adapted to aline with the keepers 41 of the trucks and each latch has a spring pressed detent 65 to engage in openings or notches 66 in the sill 2. The lower ends of the latches 63 are notched to span the tongue pin 42 and the detent 65 is adapted to hold the latch in either a raised or lowered position, the former position being shown at the forward end of the trailer chassis and the latter position at the rear end of the trailer chassis, so that the truck 8 is inactive while the truck 7 is active for guiding the trailer chassis. There may be times when the trailer is independent of the tractor and it is desired to move the trailer back and forth without any swivel action of either trucks, in which instance both of the end latches 63 may be lowered.

Reference will now be had to Figs. 9 to 15 inclusive, and for the sake of brevity I will designate the elements in these views with the same reference numerals for corresponding elements in Figs. 1 to 7 inclusive and simply note the structural changes. In the previously described form it has been noted that the trailer brake operating mechanism includes practically rigid rods connecting rockable elements, but in this form of my invention I rely on, to a great extent, flexible interconnecting members between the trucks of the trailer chassis.

The inner end of each tongue pin 42 is provided with a sleeve 67 having a pin and slot connection 68 with the tongue pin (see Fig. 13). The sleeve 67 has a hanger 69 for a horizontally disposed sheave 70 and engaging the sheave is a loop portion 71 of a flexible member having ends 72 and 73 trained over sheaves 74 supported from the yoke bracket 24 which is somewhat of a different shape from the bracket shown in Fig. 8, but serves the same purpose. The end 72 of the flexible member extends to a sheave 75 supported from the bolster 13 of the truck 7, below the tubular king pin 6 with the end of said flexible member extending upwardly through the king pin and over a sheave 76 supported from the bolster 5 of the trailer chassis 1. The flexible member then extends rearwardly over the truck 8 and has an arrangement such as just described in connection with the truck 7, with the ends 73 of the flexible members, connected to the upper ends of the double cranks 20 carried by the confronting ends of the trucks 7 and 8, instead of being located within the trucks as previously described.

Instead of mounting the hand brake levers 37 on the ends of the trailer chassis 1, I mount them horizontally at opposite sides of the trailer chassis, and connect the levers by inwardly extending flexible members 77 to the hangers 69, said flexible members extending about horizontal sheaves 78 supported by brackets 79, somewhat similar to the brackets 28. Adjacent the sheaves 78 are sheaves 80 for flexible members 81 attached to the hangers 69 and extending through the trailer sills 2 where said flexible members have eyes 82 or other connections for a tractor flexible member 83. This tractor flexible member is adapted to be connected to either of the flexible members 81 so that the brakes of said trailer brakes may be controlled from the tractor. Either of the flexible members 77 or 81 are capable of pulling upon the hanger 69 and when said hanger is shifted the loop portion 71 pulls on both ends 72 and 73 of the interconnecting flexible member causing equal application of the brakes of both trucks.

There is an improvement in connection with each tongue pin 42 residing in providing the outer end of the pin with a jaw coupling head 84 so that a tractor or other towing vehicle may be coupled direct to the trailer, but in practice I prefer to use a substantially A-shaped horizontally disposed towing tongue 85 connected to the truck 7 similar to the towing tongue 50. The tongue 85 has a draw bar 86 limited in its movement relative to the tongue 85 by a pin and slot connection 87. The draw bar abuts the coupler head 84 and is adapted to inwardly shift the tongue pin 42, but may be held against such action by a spring pressed latch 88 carried by the tongue 85 and adapted to engage in the draw bar 86. This latch is of that type that may be set in a retracted position, as shown in Fig. 14.

The provision which I have made in this latter construction for controlling the trailer brake operating mechanism from the tractor can also be installed in connection with the trailer having more or less rigid elements forming the greater part of the brake operating mechanism previously described and in both constructions it is practically impossible for a loaded trailer to overrun a tractor, either because of a grade, ruts or other road conditions. The draw bars being attached to the tractors represent prolongations thereof so as to form abutments for the tongue pins and when these tongue pins are actuated the brakes of the active and inactive trucks are simultaneously controlled. This automatic brake setting feature of my invention may be advantageously adopted for trailers in train formation operated in hilly country where it is often difficult to control a load simply by tractor brakes.

While in the drawings there are illustrated the preferred embodiments of my invention, it is to be understood that either construction is susceptible to such changes as are permissible by the appended claims.

What I claim is:—

1. In a tractor trailer combination wherein a tractor is adapted to move a trailer, said trailer comprising a chassis, a truck for each end of said chassis, a tubular swivel connection between said chassis and each truck, brakes for each truck, means operatable at each truck and extending through the tubular swivel connection of each truck to effect simultaneous application of the brakes of said trucks.

2. A tractor trailer combination as called for in claim 1, further characterized by means adapted for fixing either truck against a swivel action relative to the trailer chassis.

3. A tractor trailer combination as called for in claim 1, further characterized by a hand operated brake applying mechanism for the truck brakes.

4. In a tractor trailer combination wherein a tractor is adapted to move a trailer, said trailer comprising a chassis, a truck for each end of said chassis, a swivel fifth wheel connection between said chassis and each truck, brakes for each truck, an interconnecting mechanism between the brakes of each truck by which the brakes of said trucks may be simultaneously actuated, said mechanism extending within a zone defined by the top, bottom, side and end planes of the chassis and means carried by each truck adapted for operating said interconnecting brake mechanism.

5. A tractor trailer combination as called for in claim 4, further characterized by brake operating means on said trailer chassis adapted to utilize part of said interconnecting brake mechanism to operate the truck brakes.

6. A tractor trailer combination as called for in claim 4, wherein said interconnecting brake mechanism has portions thereof in the fifth wheel connections between said chassis and trucks.

7. In a tractor trailer combination, a trailer having a swiveled truck at each end thereof, a towing tongue applicable to either end of said trailer, and brakes for said trailer operatable from said tongue when at either end of said trailer.

8. A tractor trailer combination as called for in claim 7, further characterized by means carried by said tongue brought into action by an overrunning movement of said trailer adapted to cause application of the trailer brakes.

9. A tractor trailer combination as called for in claim 7, further characterized by means on said trailer adapted to fix either swiveled truck relative to said trailer.

10. In a tractor trailer combination, a trailer, four wheel brakes for said trailer, and means operatable at either end of said trailer adapted for simultaneously applying the brakes of the four wheels, and a towing tongue applicable to either end of the trailer, said tongue being adapted to actuate said brake applying means.

11. In a tractor trailer combination, a trailer, four wheel brakes for said trailer with the brake mechanism including portions which are located within a zone defined by the top, bottom, side and end planes of the chassis of the trailer, and means operable at either end of said trailer adapted for simultaneously applying the brakes of the four wheels.

12. In a tractor trailer combination, a trailer chassis, a swiveled truck for each end of said trailer chassis, a towing tongue applicable to either truck, brakes for each truck, an interconnecting brake mechanism between said truck and operatable from either truck for simultaneously applying the brakes of both trucks, and a draw bar carried by said towing tongue and adapted to cause actuation of said interconnecting brake mechanism by an overrunning movement of said trailer relative to said draw bar.

13. A tractor trailer combination as called for in claim 12, further characterized by means on said tongue adapted to fix said draw bar relative thereto so that said draw bar and tongue may cooperate for backing said trailer without the application of the brakes thereof.

14. A tractor trailer combination as called for in claim 12, wherein said interconnecting brake mechanism has portions thereof extending through the swivel of each truck and along said trailer chassis.

15. In a tractor trailer combination, a trailer chassis, a truck for each end of said chassis, brakes for each truck, an interconnecting brake mechanism extending from one truck to the other so that the brakes of said trucks may be simultaneously actuated, a tongue pin carried by each truck with each pin arranged to actuate said interconnecting brake mechanism, and a towing tongue applicable to either truck and adapted to abut the tongue pin of the truck to which said towing tongue is applied, said towing tongue being operative to cause actuation of said interconnecting brake mechanism when said trailer has an overrunning movement in the direction of said tongue.

16. A tractor trailer combination as called for in claim 15, further characterized by said towing tongue including a slidable draw bar adapted to be fixed relative to said towing tongue to prevent actuation of the interconnecting brake mechanism when the trailer is backed through the medium of said towing tongue.

17. A tractor trailer combination as called for in claim 15, wherein each truck has a swiveled fifth wheel connection with the trailer chassis and said interconnecting brake mechanism has portions thereof in the fifth wheel connections and along the trailer chassis.

18. A tractor trailer combination as called for in claim 15, wherein the trucks are swiveled relative to the trailer chassis, and means at each end of the trailer chassis adapted to permit of said trucks being fixed relative to said chassis for straight travel in the longitudinal direction of the trailer chassis.

19. A tractor trailer combination as called for in claim 15, further characterized by hand operated means utilizing a portion of the interconnecting brake mechanism for applying the brakes of said trucks.

20. In a tractor trailer combination wherein a tractor is adapted to move the trailer, said trailer comprising a chassis, a truck for each end of said chassis, a connection between said chassis and each truck, brakes for each truck with the brake mechanism including portions located within a zone defined by the top, bottom, side and end planes of the chassis, and means operatable at either truck to have simultaneous application of the brakes of both trucks.

21. A trailer comprising a chassis, end trucks therefor, brakes for each truck, and an interconnecting mechanism between said trucks operatable at either truck adapted for simultaneously applying the brakes of said truck, said interconnecting mechanism including portions located within a zone defined by the top, bottom, side and end planes of the chassis.

22. A trailer comprising a chassis, end trucks therefor, brakes for each truck, a mechanism interconnecting the brakes of each truck for simultaneous operation, and a hand operated mechanism on each end of said chassis with each end brake mechanism adapted to control the brakes of the truck at the opposite end of said chassis from the hand brake mechanism.

23. The combination of a towing vehicle, a trailer chassis, trucks supporting said chassis, brakes for said trucks, a swiveled connection between said trucks and the trailer chassis, a towing tongue applicable to either truck for connecting said trailer to said towing vehicle and operative to produce automatic brake operation by over-running activity of the trailer, and means operable from the towing vehicle independent of the towing tongue for controlling the operation of the truck brakes, said means extending through the connection of said trucks with the trailer chassis.

24. The combination of a trailer having wheels, brakes for each of the trailer wheels, a towing vehicle, a towing tongue connecting said trailer to said towing vehicle, means carried by said towing tongue by which all of the trailer wheel brakes may be controlled, and means operatable from the towing vehicle independent of the towing tongue adapted for controlling the trailer wheel brakes.

In testimony whereof I affix my signature.

SIDNEY B. WINN.